United States Patent
Winter et al.

(10) Patent No.: US 8,111,759 B2
(45) Date of Patent: Feb. 7, 2012

(54) METHOD AND APPARATUS FOR AUTHORING A 24P AUDIO/VIDEO DATA STREAM BY SUPPLEMENTING IT WITH ADDITIONAL 50I FORMAT DATA ITEMS

(75) Inventors: Marco Winter, Hannover (DE); Dirk Gandolph, Ronnenberg (DE); Carsten Herpel, Wennigsen (DE); Jobst Hoerentrup, Wennigsen (DE); Uwe Janssen, Seelze (DE); Ralf Ostermann, Hannover (DE); Hartmut Peters, Barsinghausen (DE); Andrej Schewzow, Hannover (DE)

(73) Assignee: Thompson Licensing, Boulogne-Billancourt (FR)

( * ) Notice: Subject to any disclaimer, the term of this patent is extended or adjusted under 35 U.S.C. 154(b) by 1116 days.

(21) Appl. No.: 11/919,850

(22) PCT Filed: Apr. 10, 2006

(86) PCT No.: PCT/EP2006/061488
§ 371 (c)(1),
(2), (4) Date: Nov. 2, 2007

(87) PCT Pub. No.: WO2006/117281
PCT Pub. Date: Nov. 9, 2006

(65) Prior Publication Data
US 2009/0086829 A1    Apr. 2, 2009

(30) Foreign Application Priority Data
May 4, 2005    (EP) .................................... 05090138

(51) Int. Cl.
*H04N 7/12*    (2006.01)
(52) U.S. Cl. .................................. 375/240.28; 386/239

(58) Field of Classification Search ........... 375/240.01–240.29; 386/239, 386/248
See application file for complete search history.

(56) References Cited

U.S. PATENT DOCUMENTS

| | | | |
|---|---|---|---|
| 4,591,928 A | 5/1986 | Bloom et al. | |
| 5,255,091 A | 10/1993 | Lyon et al. | |
| 5,809,454 A | 9/1998 | Okada et al. | |
| 2001/0050708 A1 | 12/2001 | Spence et al. | |
| 2003/0165237 A1 | 9/2003 | Farr et al. | |
| 2005/0249282 A1* | 11/2005 | Landsiedel et al. | 375/240.12 |

FOREIGN PATENT DOCUMENTS

| | | |
|---|---|---|
| EP | 0910213 | 4/1999 |
| EP | 1271359 | 1/2003 |
| EP | 1447981 | 8/2004 |
| EP | 1558033 | 7/2005 |
| EP | 1578141 | 9/2005 |
| WO | WO 00/59218 | 10/2000 |

OTHER PUBLICATIONS

Search Report Dated Aug. 22, 2006.

* cited by examiner

*Primary Examiner* — Ricky Ngo
*Assistant Examiner* — Kan Yuen
(74) *Attorney, Agent, or Firm* — Tutunjian & Bitetto, P.C.

(57) ABSTRACT

Movies are produced in 24 Hz frame frequency and progressive scanning format (denoted 24p) for projection in film theatres, adhering to a worldwide standard for 35 mm film. However, the major TV systems in the world use interlaced scanning and either 50 Hz field frequency (denoted 50i) or 60 Hz field frequency (denoted 60i). Content providers would prefer providing single-picture-frequency single-audio-speed AV discs that can be replayed in most parts of the world. A 24p audio/video data stream is supplemented with additional 50i format data items thereby allowing 24p and 50i format replay of that data stream.

24 Claims, 7 Drawing Sheets

Figure 1:
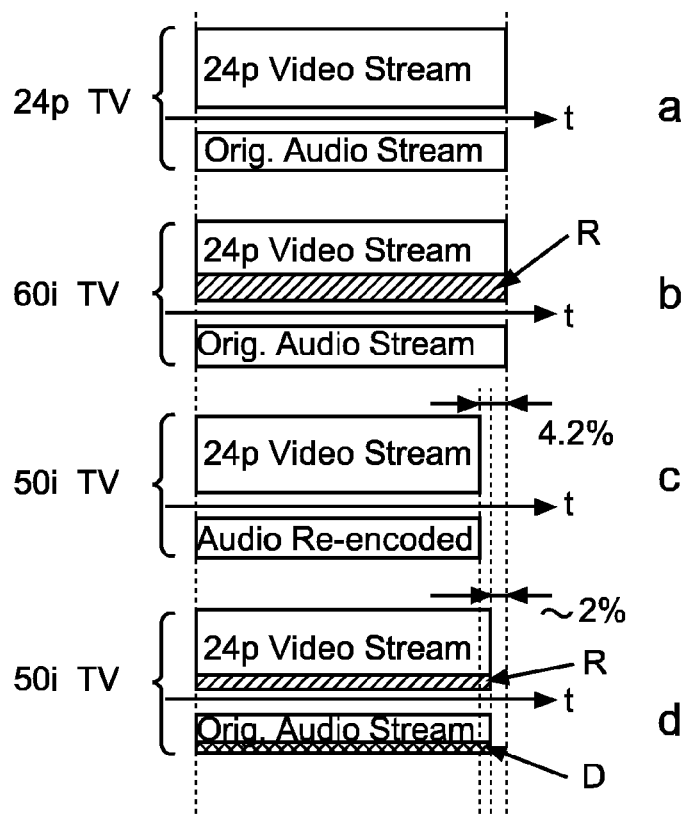

METHOD AND APPARATUS FOR AUTHORING A 24P AUDIO/VIDEO DATA STREAM BY SUPPLEMENTING IT WITH ADDITIONAL 50I FORMAT DATA ITEMS

This application claims the benefit, under 35 U.S.C. §365 of International Application PCT/EP2006/061488, filed Apr. 10, 2006, which was published in accordance with PCT Article 21(2) on Nov. 9, 2006 in English and which claims the benefit of European patent application No. 05090138.8, filed May 4, 2005.

The invention relates to a method and to an apparatus for authoring a 24p (24 Hz) audio/video data stream by supplementing it with additional 50i format data items thereby allowing 24p and 50i format replay of that data stream.

BACKGROUND

Movies are produced in 24 Hz frame frequency and progressive scanning format (denoted 24p) for projection in film theatres, adhering to a worldwide standard for 35 mm film. The projection speed has been fixed since many decades to 24 full pictures per second. Accompanying sound signals, typically present as optical tracks on the same material, are replayed with the same speed. Such playback can be performed in virtually any existing film theatre in the world.

The situation becomes different when such movies are played back via a television system, e.g. by a broadcaster. The major TV systems in the world use interlaced scanning and either 50 Hz field frequency (denoted 50i, e.g. in Europe, China and Australia for PAL and SECAM) or 60 Hz field frequency (denoted 60i, e.g. in USA and Japan for NTSC).

In 60i countries the TV system is constructed such that 30 full video frames are displayed per second. Movie playback is performed with basically correct overall speed by presenting one film frame alternately in two or in three video fields using 3:2 pull-down. It should be noted that in the NTSC colour TV system the actual field rate is 59.94 Hz, which means that the movie is actually broadcast with 23.976 frames per second, i.e. slower than original speed by a factor of 1000/1001. This is generally not noticed by TV viewers.

In 50 Hz countries the situation is more difficult. The simplest solution is running the movie with 25 frames per second, i.e. 4.2% faster. Although by this method the sound has a 4.2% higher pitch (nearly one half-tone higher), typically customers do not complain. If movies are recorded on A/V media (e.g. VCR Videos, CDIs and DVDs) and such media are played back using TV receivers as presentation devices, generally the same principles apply. If the accompanying sound present on the medium is in digital form (e.g. linear PCM or AC-3 coded or DTS coded), either the playback device must decode and present the audio information with 4.2% higher speed, which generally is not a problem, or DVD Video or CDI discs sold in 50 Hz countries must contain audio data streams that are already encoded such that, while the video signal is output with 4.2% higher speed, the player's audio decoder automatically outputs the correct speed and pitch of the audio signal.

To summarise, there are currently three established playback speeds for AV streams (Audio Video streams): 24 progressive frames per second (24p) used in cinemas, 50 interlaced fields per second (50i) and 60 interlaced fields per second (60i).

An alternative would be carrying out audio decoding, pitch-conversion and audio re-encoding in the player. However, this would require very expensive player hardware and higher license costs because of the additional audio encoding. Therefore audio re-encoding must be performed during authoring, because it needs a lot of processor power (i.e. expensive hardware) and special licenses and software for the re-encoding of the diverse compressed audio streams. So, the required audio re-encoding is the actual reason for producing two masters for the same movie.

If a disc manufacturer produces a record for more than two different speeds, then a transformation from one speed to one of the other speeds would be the first choice. Because it consumes too much time and money to produce the movie again with the new speed, the original movie will be used again, i.e. the original record will be transcoded to the new speed. Usually moviemakers transcode 24p movies to 60i DVD Videos and to 50i DVD Videos.

Modern TV receivers can handle different playback speeds while keeping the same colour system PAL, NTSC or SECAM. For example, many TV sets sold currently in Europe can present replayed 60i records. But many old TV sets can not handle video input signals having such speed shifts. Even some modern 100 Hz TV sets are malfunctioning when receiving 60i input data. Some old devices play back coloured 60i content without colour, other devices can not play back even a stable picture. For such reason e.g. the DVD Video Format distinguishes between 50i and 60i countries for getting discs with their preferred/supported speed.

Note that the (analog) colour system does not matter anyway because it is not part of the recorded (MPEG) bit streams. The appropriate colour system will be applied or encoded after decompression of the video content.

As mentioned above, 3:2 pull-down is used for transcoding from 24p to 60i. The consumers in 60i countries know and widely accept the resulting drawbacks like slightly jerking video playback due to field repetition. A 4.2% faster playback speed is used for transcoding from 24p to 50i. Most consumers in 50i countries accept the resulting drawbacks like 50i flickering and increased pitch. Some drawbacks are already reduced or even removed, e.g. by using 100 Hz TV sets with sophisticated motion compensation. However, the total playing time is 4.2% shorter than in cinema. The advantage of such speed-up is that the video playback does not have any jerks, but the audio stream must be transcoded to perform the faster playback. So, the audio streams of the same movie differ between 50i discs and 60i discs, but the (MPEG) video stream is very similar. The main difference of the video streams is that the 60i video stream contains additional 3:2 pull-down flags and different time stamps. MPEG means e.g. MPEG-2 Video, MPEG-4 Video or MPEG-4 AVC. Consumers accept the drawbacks of the transcoding method used in their country but do not like the different drawbacks of the other country. The 60i consumers don't like the flickering of 50i TV sets (theoretically this could be overcome by replacing current 60i TV sets by TV sets, which are also compatible to 50i by applying 100 Hz techniques, or by using slow LCD displays). The 50i consumers don't like the jerks of the 60i video (theoretically this could be overcome by replacing current discs, players and TV sets by 24p compatible discs, players, and TV sets).

Current DVD players do not support 24p playback.

It is to be noted that the compressed digital audio is always encoded for the desired playback speed because a player may send the uncompressed audio stream directly to an external decoder.

Conventional authoring, e.g. of DVD Video, is usually carried out in two main procedures.

For 60i Countries:
encoding video in 24p format and adding a 3-2 pulldown feature for 60i playback;

encoding digital audio for the diverse decoders and languages;
encoding sub-titles (in DVD: sub-pictures);
generating menus;
making the master.
For 50i Countries:
re-stamping the encoded video and removing 3-2 pull-down;
re-encoding the digital audio streams, e.g. using pitch conversion;
encoding sub-titles (in DVD: sub-pictures);
adapting the menus;
making the second master.

A 60i disc is not playable on many TV sets in 50i countries. A 50i disc is not playable on most TV sets in 60i countries.

EP 05090020.8 describes a 24p disc that can be replayed for 50i presentation, whereby video fields are repeated adaptively and audio frames are dropped adaptively in order to achieve on average an audio speed that matches the video speed upon presentation of the recorded program.

INVENTION

Content providers would prefer providing single-picture-frequency single-audio-speed AV discs that can be replayed in most parts of the world. Of course, this won't work for all discs sold worldwide because of the need of providing audio in diverse languages and there is not enough memory available on e.g. one DVD disc to store all audio languages together with the video.

However, new disc formats like HD-DVD or Blu-ray provide more disc capacity for the AV content. Blu-ray recorders are on the Japanese market since April 2003.

Also, more and more new TV sets in the market are able to process and to present even 24p format video.

A problem to be solved by the invention is to provide for a 24p (or 48p or 60p) storage medium mastering, the AV content of which can be presented with a high subjective video and audio quality also in 50i format worldwide, the best locations in the AV content at which video fields can be repeated and audio frames can be dropped. This problem is solved by the methods disclosed in claims 1, 2 and 3. An apparatus that utilises the method of claim 1 is disclosed in claim 3. A corresponding storage medium is disclosed in claim 11. A corresponding audio/video data stream is disclosed in claim 12.

As mentioned above, different audio 'speeds' are required for different countries. Because today's AV storage media use compressed audio streams a simple speed shift by automatic pitch conversion of the audio stream is not feasible. The player would need to decode the audio stream, to carry out a pitch conversion, and to re-encode or re-compress the audio stream for all channels to deliver appropriate standardised digital audio streams to external audio decoders. This would lead to unacceptable expensive disc players because of the additional hardware requirements for decoding and encoding different audio stream code types (e.g. DTS, AC-3, MPEG), and because of additional license costs for the audio re-encoding.

When making use of the invention, in the media player or recorder either audio signal frames to be dropped adaptively (A-drop) and/or video fields or frames to be repeated adaptively (V-repeat), depending on the current video and audio content. The dropping and the repetition depend on the current content of the video and audio signals such that the signal where a dropping or a repeating, respectively, is more perceptible controls the synchronisation between the video and audio signals for their common presentation. Repeating special video fields or frames and dropping special audio frames leads to a synchronised AV stream, which is compatible for a display/loudspeakers set or a monitor or a TV set which can not process or present 24p content with 24p or 60i speed.

Thereby the user can play back the disc content in the highest picture and audio quality as is possible by his display or TV set. The playback quality limitation does not depend on the disc content format but on the user's type of display.

In the invention, the term "original audio signal speed" refers to an audio coding and an audio replay speed that match the originally intended video format replay speed. If e.g. the originally intended video format replay speed corresponds to the 24p format, the audio coding and the intended audio replay speed or presentation correspond to that of the 24p format.

The disc or storage medium to be mastered contains the original 24p video and appropriate coded audio data facilitating original playback speed, with additional information being medium-stored about specific audio signal frames or blocks and about specific video signal frames or fields:

The original AV data is used to playback the content for a 24p compatible display/loudspeakers or TV set, thereby achieving the best picture quality.

Known 3:2 pull-down information or data items embedded in the AV data stream are used to playback the AV stream for a 60i display/loudspeakers or TV set, e.g. special flags in the MPEG video stream as applied for 60i DVD Video discs.

For 50i presentation, the 24p video is to be presented to the video output without use of 3:2 pulldown. Only some selected video fields are to be additionally presented to the video output. This slows down the video output, e.g. from 4.2% faster than original speed to 2% faster than original speed. The corresponding field selection is made during authoring.

There are:
scenes which are suitable for video field/frame repeat and for audio frame drop;
scenes which are suitable for video field/frame repeat, but not for audio frame drop;
not suitable for video field/frame repeat, but for audio frame drop;
neither suitable for video field/frame repeat nor for audio frame drop.

Many scenes do not need exact synchronisation, for example scenes of landscape video with background music. In such scenes the cuts between two scenes may repeat some black video frames to get synchronised with the audio.

Some selected audio frames are to be dropped. This speeds up the audio output, e.g. from original speed to 2% faster than original speed.

Both measures lead to a synchronised video/audio playback that in average is e.g. 2% faster than the original 24p movie speed. The corresponding audio frame selection is made during authoring.

Special A-drop and V-repeat information or data items are inserted into the AV stream for a 50i presentation, whereby the resulting average playback speed of the 24p AV stream on a 50i TV set or display/loudspeakers is between 48i and 50i speed and is momentarily variable within (or even beyond) that range.

Dependent on the current video and audio content (i.e. the scene content) the balance between video slow-down and audio speed-up changes. E.g. video slow-down for scenes with strong motion would lead to visible jerks during playback. So, audio speed-up is preferred for such scenes.

The inventive authoring, e.g. of DVD Video, can be carried out in a single main procedure:
a) encoding digital video in 24p format and adding a 3-2 pulldown feature for 60i playback;
b) encoding digital audio according to 24p format speed, for the diverse decoders and languages;
c) encoding sub-titles (in DVD: sub-pictures);
d) generating menus;
e) author the 50i content:
e.1) categorise the scene types in the AV stream;
e.2) put or hide repetition of video/dropping of audio in the AV stream;
e.3) align sub-title units to audio or video;
e.4) incorporate the 50i information items into the 24p/60i disc data image (that is e.g. stored on a harddisc), i.e. into the AV stream and the .ifo file or files;
f) making the master.

If the principle of the invention would become part of a standard specification like HD-DVD or Blu-ray, it would allow producing storage media or discs that are compatible with 50i displays as well as with 60i displays and 24p displays. This will reduce cost (only one master is required instead of two) and facilitate interchanging of discs between 50i and 60i countries.

In principle, the inventive method is suited for authoring or generating or coding an audio/video data stream that represents a video signal and one or more audio signals, said video signal having 24 Hz video frame frequency and said audio signal or signals having original speed, wherein said authoring or generating or coding includes the following steps:
encoding video data in 24p format and optionally adding 3-2 pulldown data items for facilitating a playback with 60 Hz or nearly 60 Hz field frequency,
and encoding audio data according to said original speed;
encoding sub-title data, and generating menus related to at least one of said video, audio data and sub-title data;
generating additional data items for facilitating a subjectively synchronised presentation of said audio and video signals with an average field frequency lying in the range between 48 Hz and 50 Hz, denoted 50i format, thereby including in said audio/video data stream video repetition information items which can be used in a presentation unit for said video and audio signals for controlling video signal field or frame repetition, and including audio dropping information items which can be used in said presentation unit for controlling audio signal frame dropping,
said method including the further steps:
automatically determining video and audio scenes in said audio/video data stream and automatically categorising different types of said video and audio scenes with respect to the required video/audio presentation synchronism in said 50i format, including determining critical video and audio scenes in which no audio frame drop or video field repeat, respectively, shall occur;
calculating for each one of said scenes the maximum manageable number of audio frame drops and/or video field repeats, respectively;
calculating a corresponding distribution of audio frame drop information items and/or video field repeat information items for non-critical scenes,
and calculating whether or not the video/audio delay introduced by a current critical scene can be compensated for by a corresponding number of audio frame drops and/or video field repeats in adjacent non-critical scenes, and
if true, providing a corresponding number of video repetition information items and audio dropping information items for the non-critical scenes, said video repetition information items and said audio dropping information items forming a part of said 50i format additional data items,
if not true, re-encoding in said 50i format audio data or video data for said current critical scene so as to form a part of said 50i format additional data items;
incorporating said 50i format additional data items into related data fields of said audio/video data stream or a copy of said audio/video data stream.

In principle, the inventive method is suited for authoring or generating or coding an audio/video data stream that represents a video signal and one or more audio signals, said video signal having 60 Hz video frame frequency and said audio signal or signals having original speed, wherein said authoring or generating or coding includes the following steps:
encoding video data in 60p format, and encoding audio data according to said original speed;
encoding sub-title data, and generating menus related to at least one of said video, audio data and sub-title data;
generating additional data items for facilitating a subjectively synchronised presentation of said audio and video signals with an average field frequency lying in the range between 48 Hz and 50 Hz, denoted 50i format, thereby including in said audio/video data stream video dropping information items which can be used in a presentation unit for said video and audio signals for controlling video signal field or frame dropping, and including audio dropping information items which can be used in said presentation unit for controlling audio signal frame dropping, said method including the further steps:
automatically determining video and audio scenes in said audio/video data stream and automatically categorising different types of said video and audio scenes with respect to the required video/audio presentation synchronism in said 50i format, including determining critical video and audio scenes in which no audio frame drop or video field or frame drop, respectively, shall occur;
calculating for each one of said scenes the maximum manageable number of audio frame drops and/or video field or frame drops, respectively;
calculating a corresponding distribution of audio frame drop information items and/or video field or frame drop information items for non-critical scenes,
and calculating whether or not the video/audio delay introduced by a current critical scene can be compensated for by a corresponding number of audio frame drops and/or video field or frame drops in adjacent non-critical scenes, and
if true, providing a corresponding number of video dropping information items and audio dropping information items for the non-critical scenes, said video dropping information items and said audio dropping information items forming a part of said 50i format additional data items,
if not true, re-encoding in said 50i format audio data or video data for said current critical scene so as to form a part of said 50i format additional data items;
incorporating said 50i format additional data items into related data fields of said audio/video data stream or a copy of said audio/video data stream.

In principle, the inventive method is suited for authoring or generating or coding an audio/video data stream that represents a video signal and one or more audio signals, said video signal having 48 Hz video frame frequency and said audio signal or signals having original speed, wherein said authoring or generating or coding includes the following steps:

encoding video data in 48p format and adding 3-2 pulldown data items for facilitating a playback with 60 Hz or nearly 60 Hz frame frequency, and encoding audio data according to said original speed;

encoding sub-title data, and generating menus related to at least one of said video, audio data and sub-title data;

generating additional data items for facilitating a subjectively synchronised presentation of said audio and video signals with an average field frequency lying in the range between 48 Hz and 50 Hz, denoted 50i format, thereby ignoring said 3-2 pulldown data items for said 50i format presentation and including in said audio/video data stream video dropping information items which can be used in a presentation unit for said video and audio signals for controlling video signal field or frame dropping, and including audio dropping information items which can be used in said presentation unit for controlling audio signal frame dropping, said method including the further steps:

automatically determining video and audio scenes in said audio/video data stream and automatically categorising different types of said video and audio scenes with respect to the required video/audio presentation synchronism in said 50i format, including determining critical video and audio scenes in which no audio frame drop or video field repeat, respectively, shall occur;

calculating for each one of said scenes the maximum manageable number of audio frame drops and/or video field or frame drops, respectively;

calculating a corresponding distribution of audio frame drop information items and/or video field or frame drop information items for non-critical scenes, and calculating whether or not the video/audio delay introduced by a current critical scene can be compensated for by a corresponding number of audio frame drops and/or video field or frame drops in adjacent non-critical scenes, and if true, providing a corresponding number of video dropping information items and audio dropping information items for the non-critical scenes, said video dropping information items and said audio dropping information items forming a part of said 50i format additional data items, if not true, re-encoding in said 50i format audio data or video data for said current critical scene so as to form a part of said 50i format additional data items;

incorporating said 50i format additional data items into related data fields of said audio/video data stream or a copy of said audio/video data stream.

In principle the inventive apparatus is suited for authoring or generating or coding an audio/video data stream that represents a video signal and one or more audio signals, said video signal having 24 Hz video frame frequency and said audio signal or signals having original speed, wherein said authoring or generating or coding apparatus includes:

means being adapted for encoding video data in 24p format and optionally adding 3-2 pulldown data items for facilitating a playback with 60 Hz or nearly 60 Hz field frequency, and for encoding audio data according to said original speed, and for encoding sub-title data, and for generating menus related to at least one of said video, audio data and sub-title data;

means being adapted for generating additional data items for facilitating a subjectively synchronised presentation of said audio and video signals with an average field frequency lying in the range between 48 Hz and 50 Hz, denoted 50i format, thereby including in said audio/video data stream video repetition information items which can be used in a presentation unit for said video and audio signals for controlling video signal field or frame repetition, and including audio dropping information items which can be used in said presentation unit for controlling audio signal frame dropping, whereby:

said means automatically determine video and audio scenes in said audio/video data stream and automatically categorise different types of said video and audio scenes with respect to the required video/audio presentation synchronism in said 50i format, including determining critical video and audio scenes in which no audio frame drop or video field repeat, respectively, shall occur;

said means calculate for each one of said scenes the maximum manageable number of audio frame drops and/or video field repeats, respectively;

said means calculate a corresponding distribution of audio frame drop information items and/or video field repeat information items for non-critical scenes, and calculate whether or not the video/audio delay introduced by a current critical scene can be compensated for by a corresponding number of audio frame drops and/or video field repeats in adjacent non-critical scenes, and if true, provide a corresponding number of video repetition information items and audio dropping information items for the non-critical scenes, said video repetition information items and said audio dropping information items forming a part of said 50i format additional data items, if not true, re-encode in said 50i format audio data or video data for said current critical scene so as to form a part of said 50i format additional data items;

said means incorporate said 50i format additional data items into related data fields of said audio/video data stream or a copy of said audio/video data stream.

Advantageous additional embodiments of the invention are disclosed in the respective dependent claims.

DRAWINGS

Figure 2:
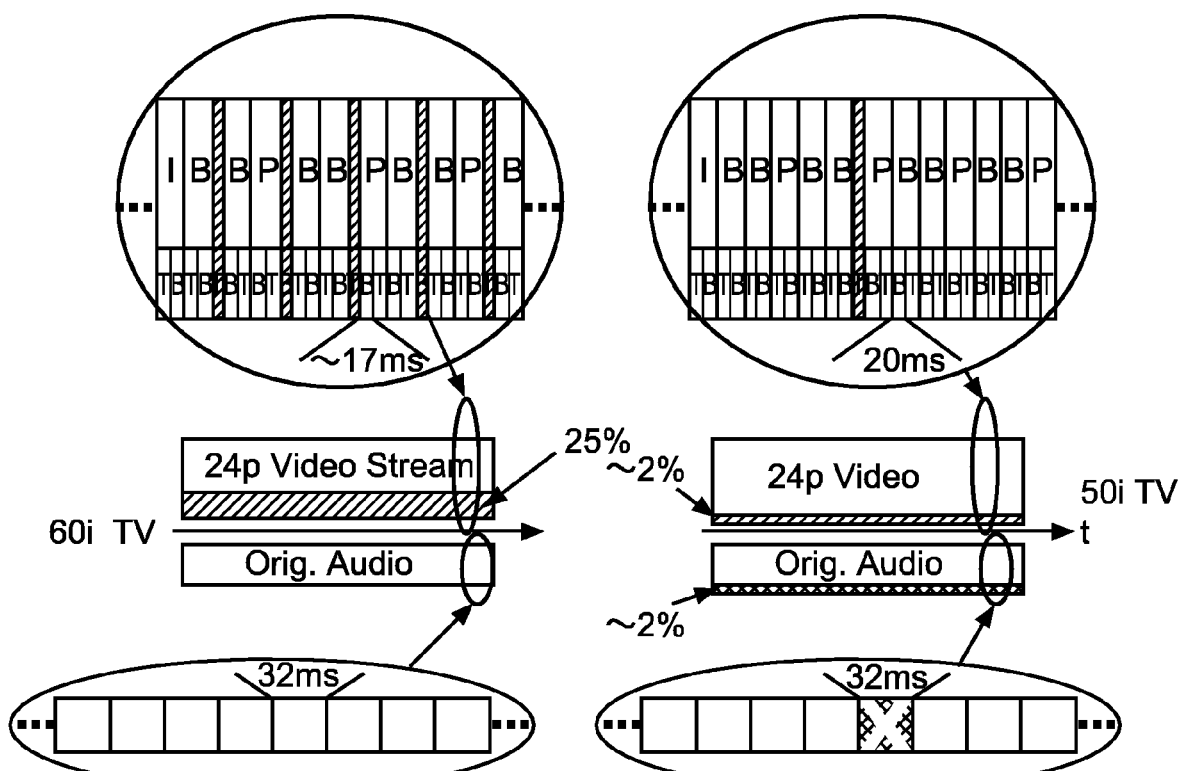
Figure 3:
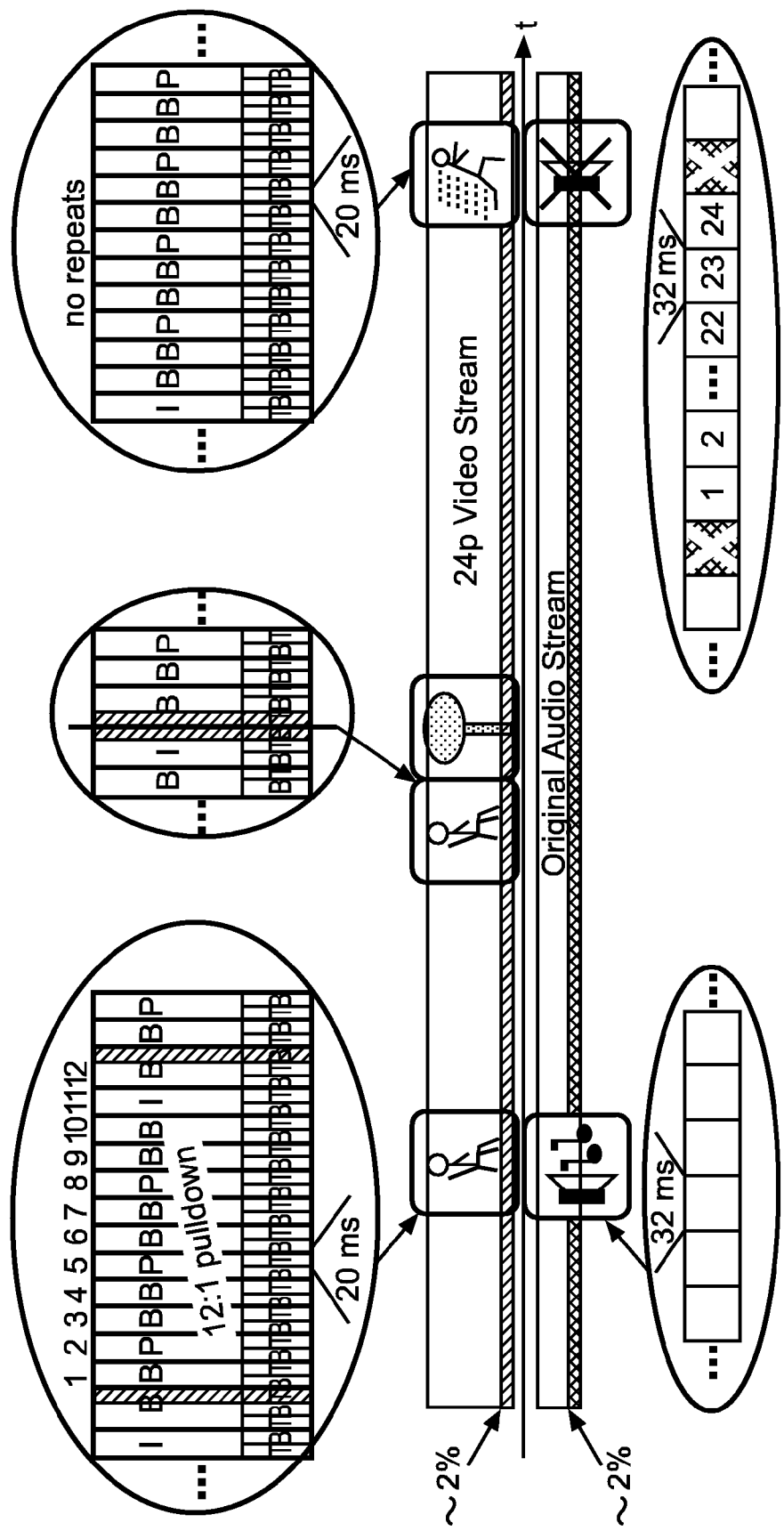
Figure 4:
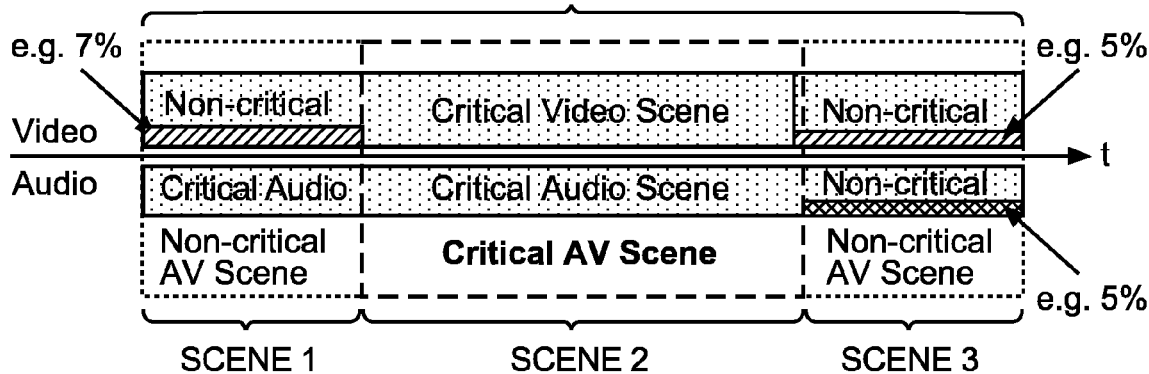
Figure 5:
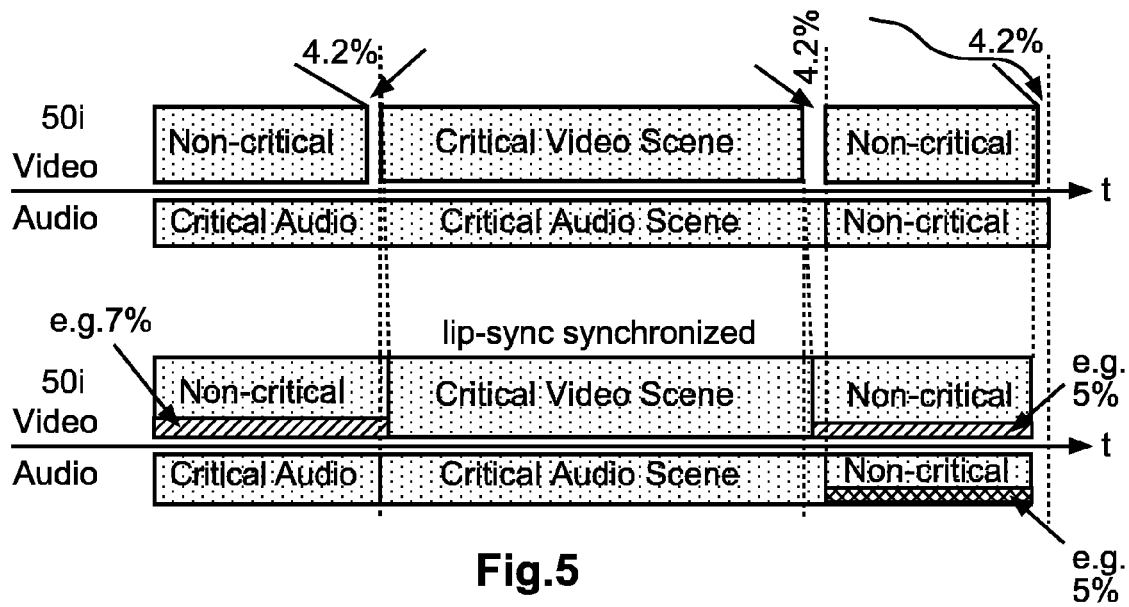
Figure 6:
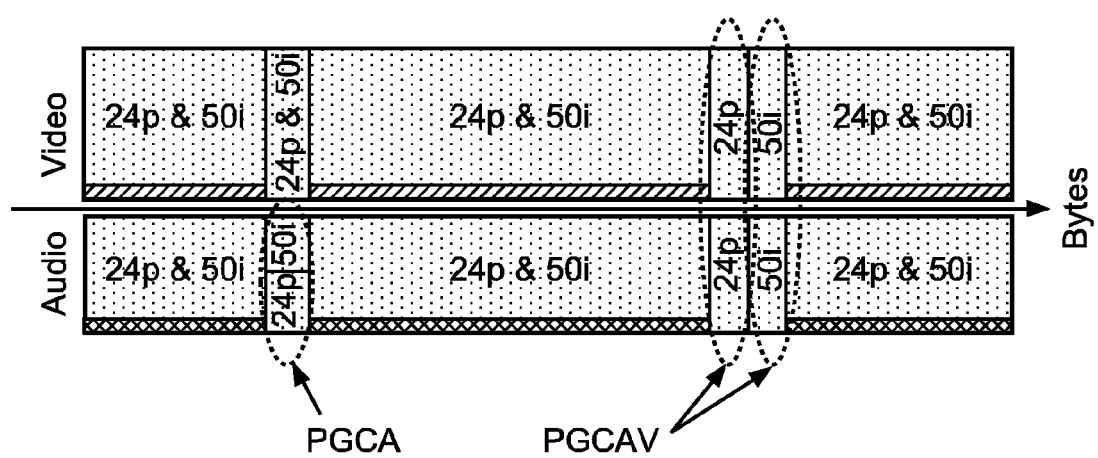
Figure 7:
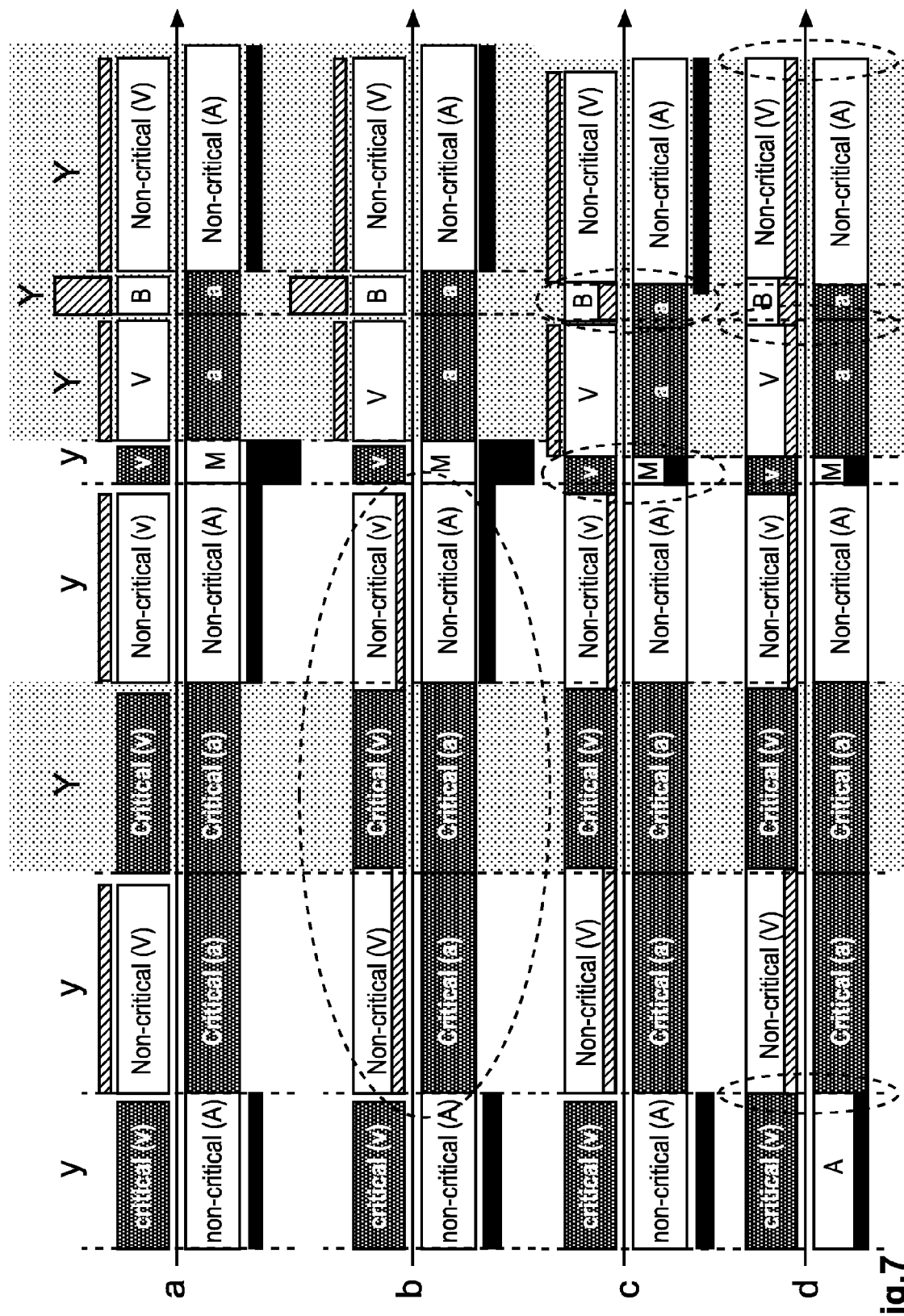
Figure 8:
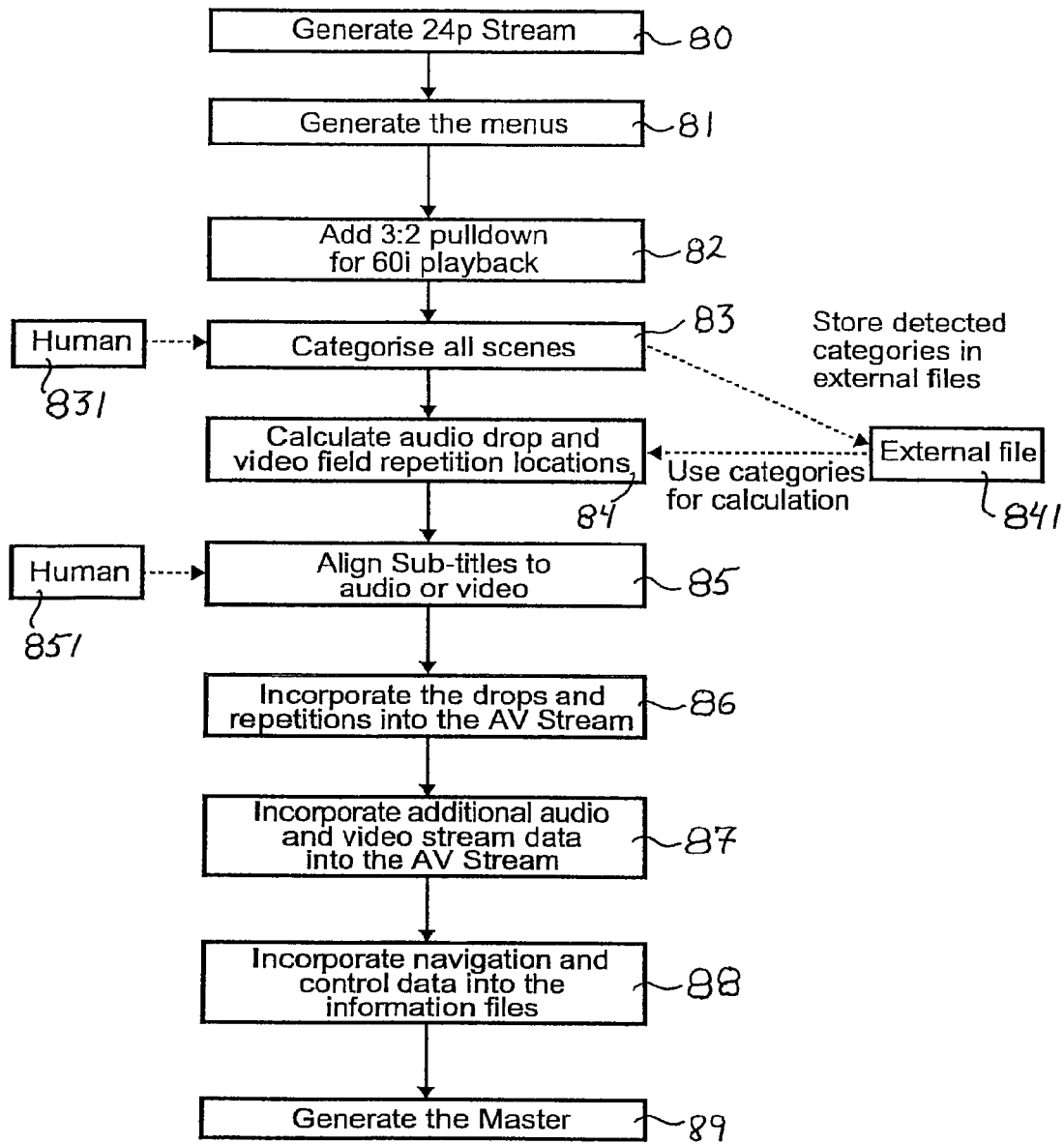
Figure 9:
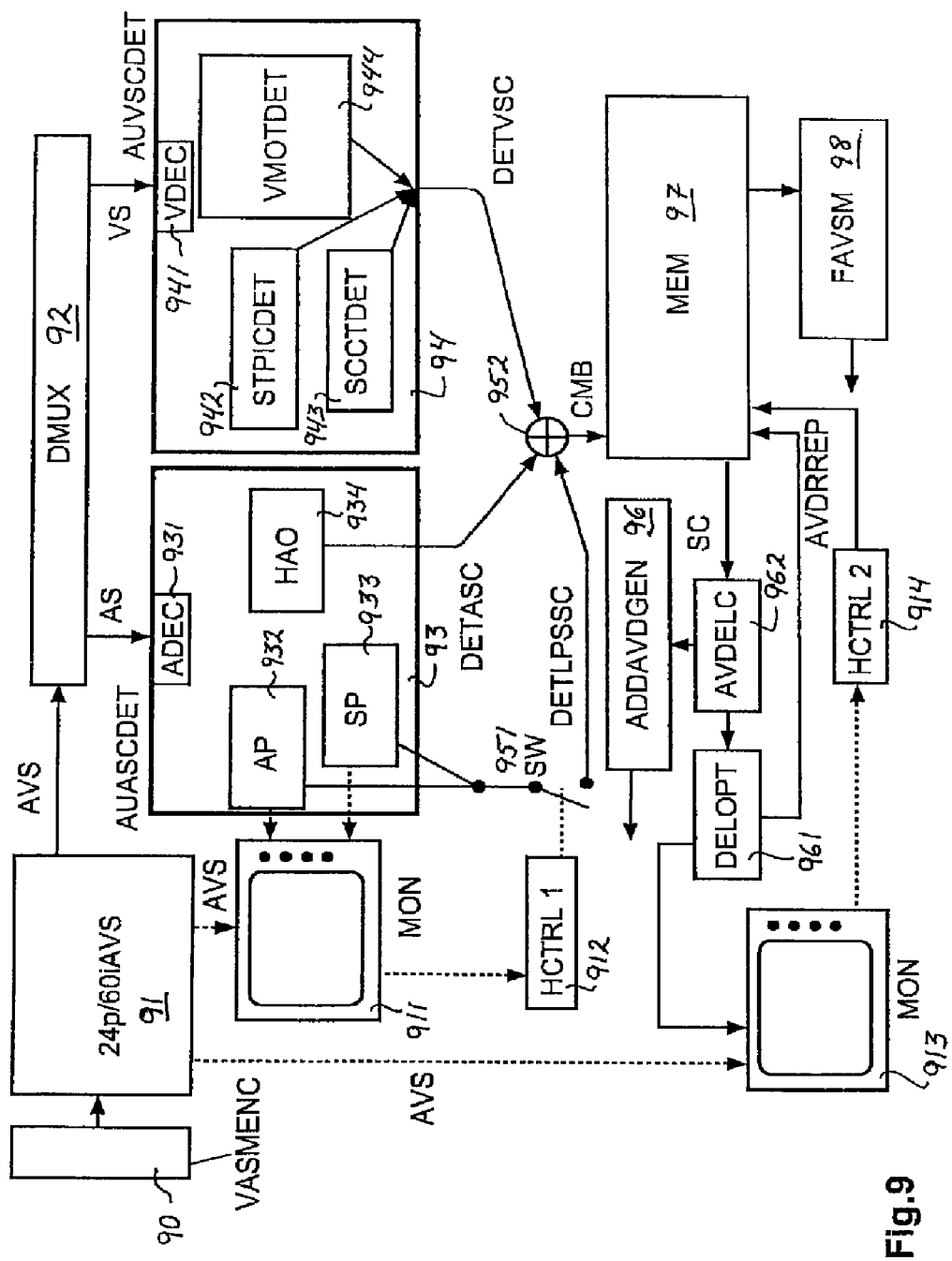
Figure 10:
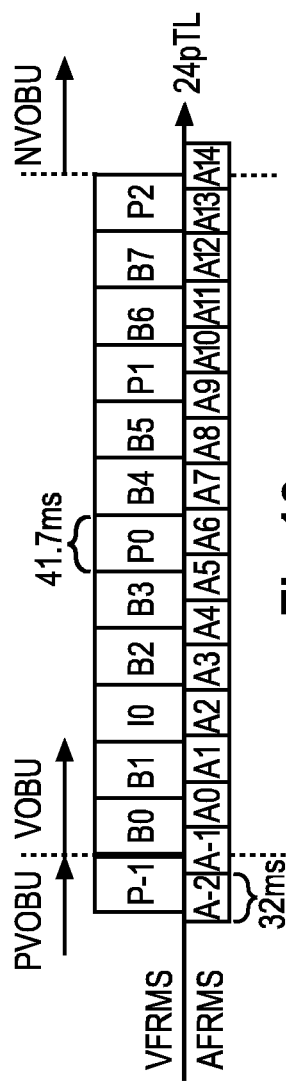
Figure 11:
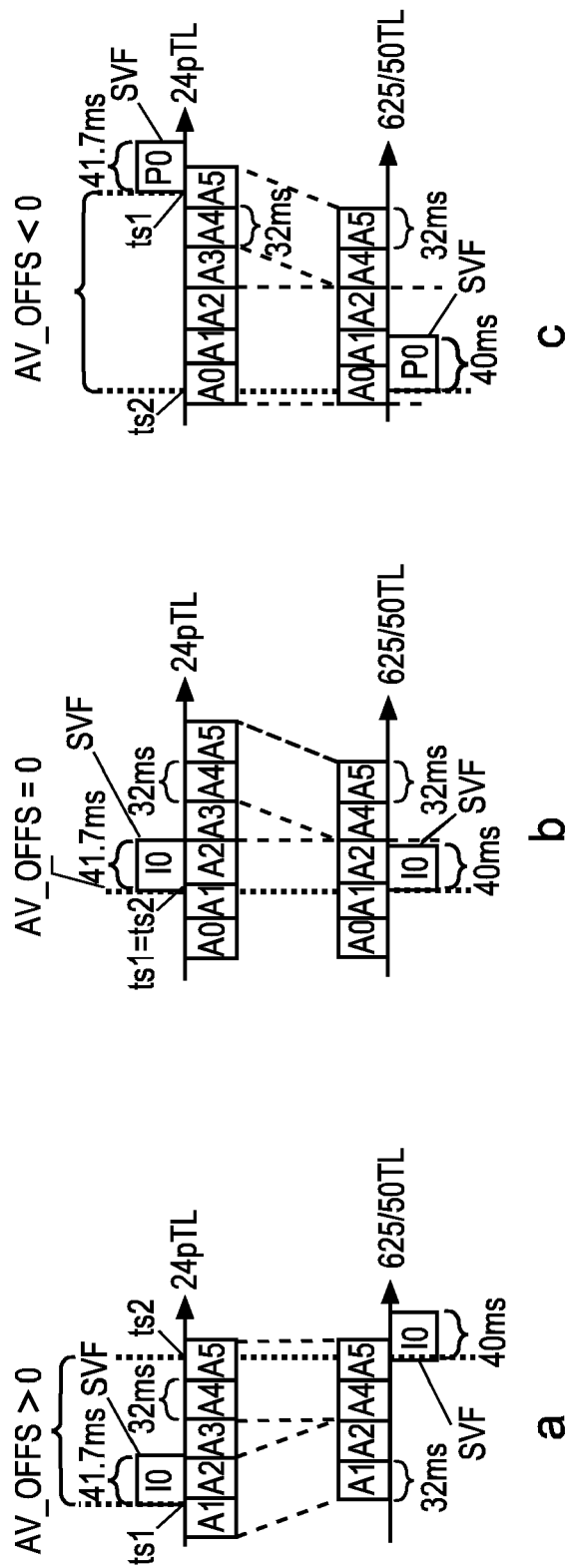

Exemplary embodiments of the invention are described with reference to the accompanying drawings, which show in:

FIG. 1 comparison of the known presentation modes 24p, 60i and 50i, and the 50i presentation mode related to the invention;

FIG. 2 difference between 3:2 pulldown 60i processing and 50i processing with only a few smartly selected audio drops/video repetitions;

FIG. 3 examples of smartly selected audio frame drops and video field repetitions;

FIG. 4 handling for critical scenes, scene1 and scene3 compensate for the delay between audio and video introduced by scene2;

FIG. 5 emphasised delays with respect to FIG. 4;

FIG. 6 scenes that are too critical so that additional 50i related audio streams or whole AV sequences are inserted into the stream;

FIG. 7 depicted steps in the audio frame drop and video field repetition process;

FIG. 8 flow diagram of the inventive mastering process;

FIG. 9 block diagram of an inventive mastering device;

FIG. 10 a VOBU or GOP with video frames and associated audio frames;

FIG. 11 handling of offset between video and audio.

EXEMPLARY EMBODIMENTS

FIG. 1 depicts the known presentation modes 24p in FIG. 1a, 60i in FIG. 1b and 50i in FIG. 1c, and the 50i presentation mode related to the invention in FIG. 1d. The hatched areas at the bottom of some audio or video data rectangles indicate the relative amount of dropped/repeated audio or video data. For example, in FIG. 1b the 3:2 pulldown for 60i shows 25% of the coded video fields twice. In FIG. 1d the repeat of selected video fields adds about 2% and the drop of selected audio frames occupies about 2%.

In practise, the average video stream playback speed $V_v$ is decreased from 50i closer to 48i ($48i \leq V_v \leq 50i$) and the average audio stream playback speed $V_a$ is increased from 48i closer to 50i ($48i \leq V_a \leq 50i$) with the result that on average $V_v$ is equal to $V_a$ (however, there may occur small possible time gaps at the beginning and at the end of a playback). $V_a$ and $V_v$ may (and frequently will) vary inside the AV stream. With other words, the resulting average playback speed of the 24p AV stream on a 50i TV set or display/loudspeakers is somewhere between 48i and 50i, i.e. the average playback speed is increased by between 0 and 4.2%. Locally, during short time periods, the video or audio speed can be slower than 48i and faster than 50i.

In a different view, FIG. 2 shows the difference between 60i 3:2 pulldown and 50i presentation. The upper part of FIG. 2 shows part of an MPEG GOP (group of pictures) containing an I encoded picture I, predicted encoded pictures P, and bi-directionally predicted encoded pictures B together with their top fields T and bottom fields B. For 50i format only a few (smartly selected) video fields are repeated (hatched area) and only a few (smartly selected) audio frames (each representing e.g. 32 ms of audio) are dropped.

Annoying 50i-related effects would occur:
in case of video field repetitions during strong motions in the video;
in case of audio frame droppings during harmonic sound;
in case of delays between audio and video during lip-sync scenes.

Such annoying effects will be avoided by the inventive smart scattering of the audio frame drops/video field repetitions.

FIG. 3 shows some examples of smartly selected audio frame drops/video field repetitions. In the left part there is no or nearly no motion while violin music is playing. There is no audio frame drop. In the depicted GOP having a length of 12 pictures, in the first B picture following the I picture, a top field is repeated. Thereby the following pictures each start with a bottom field until the next field repeat occurs.

The middle part represents a scene cut where at the end of the first scene the field is repeated as a bottom field and the first field of the second scene is headed by an additional top field.

The right and nearly silent part represents a further scene with strong motion. No field repetition is foreseen but more frequent audio frame drops are forced.

The four phases e.1) to e.4) of the above step e) are described in more detail in the following:

e.1) Categorise the Scenes in the AV Stream

This phase categorises the whole video sequence into scenes. Each scene change describes a change of a special behaviour of the video or audio presentation, or both.

Scene Categories Include:
category type: motion, sound, scene cuts, lip-sync;
level of the category type found (the kind and amount of levels of each category type depend on the type);
time-stamp of the scene start.

Generally:
a new scene stops the previous scene (as realised in DVD Video for sub-picture units);
a new scene starts when one or more category levels are changing;
each scene is described by all categories but different levels.

Phase e.1) includes several detection processes—two for the video content and two for the audio content—which may be carried out in parallel.

Detecting Video Related Categories:
Detecting motion in the scenes (is an automatic process)
Using MPEG or VC1 motion vectors to determine scenes: 3 levels: still picture (1), low motion (2), strong harmonic motion (3);
blank video frames are still pictures (appear often).
Using luminance DC values for detecting very dark or bright scenes (this is ideal for field repetitions, i.e. it shall be marked as level(2)).
A higher resolution of the levels (e.g. 10 levels) will lead to a smoother hiding of video frame repeats, i.e. scenes including some motion could cover less video field repetitions than scenes having less motion.

Detecting scene cuts (is an automatic process)
Already available software automatically detects scene-cuts:
3 levels: scene start (1), scene end (2), non-scene-cut (3) scene;
the 1st frame of a level(1) scene or the last frame of a level(2) scene are ideal for performing a video field repetition;
a detected cut does not need to be a real scene cut (i.e. the scene cut detecting process is strongly fault-tolerant). Scenes with spontaneous changes from one picture to the next (e.g. flashes) would fit into this category.

Detecting Sound Related Categories:
Detecting sound scenes. This is an automatic process in which a sound analyser (program) detects volume and/or frequency changes:
level(1): muted audio, even short breaks during speaking or music;
level(2): low volume, hearable noise, or non-music, or constant frequencies and volume;
level(3): change of harmonic audio (e.g. a violin concert) without any hearable noise. Note that short level (2)-scenes appear even during e.g. violin concerts.
A higher resolution of the levels (e.g. 10 levels) will lead to a smoother hiding of audio frame drops.

Detecting lip-sync scenes. This is an automatic scene candidate detection. A sound analyser (program) detects speaking and/or sound peaks. A person confirms, whether or not the found candidate scenes require lip-sync. Two levels are used:
lip-sync(1);
non-lip-sync(2).
A higher resolution of the levels (e.g. 10 levels) facilitates different levels of allowed delays. For example, a clapping door needs a strong 'lip'-synchronisation. But, for the sound of a passing car a small delay between audio and video is acceptable.

In other words, the category types are:
scene cut currently present/not present;
lip-sync of audio and video currently required/not required,
and at least one video related and at least one audio related type from:

motion/no motion in current video content;
very dark or very bright scene currently present/not present;
sound currently present/not present;
low volume, or hearable noise, or non-music, or constant frequencies and volume currently present/not present;
current change of harmonic audio without any hearable noise present/not present.

The scene categorising process is mainly an automatic process. Merely candidate lip-sync scenes require confirmation or rejection by a person. This process is strongly fault-tolerant, precise settings are not necessary. The categorising process results in a list of categories and assigned time-stamps.

A category list for a demonstration movie disc has been generated. FIG. 7 shows a short example excerpt of its categorising process. The video frame number is used as a time-stamp. B/V/v indicate video motion levels (1)/(2)/(3). M/A/a indicate audio sound levels (1)/(2)/(3). S/s/— indicate scene cuts (scene start/end/non-scene-cut). Y/y indicate lip-sync/non-lip-sync.

FIG. 7a depicts the calculation of manageable delay ranges. FIG. 7b depicts managing of critical scenes and pre- and post-delays. FIG. 7c depicts the optimisation. FIG. 7d depicts the finalisation. The dotted circles show areas which have been changed from their previous state.

e.2) Put or Hide of Video Repeat/Audio Drop in the AV Stream

This phase uses the categories found above to calculate audio frame drops and video field repetitions. The processing can be carried out as follows:

Calculate manageable delay ranges (min and max drops/repeats) for each scene, see FIG. 7a and FIG. 4. In FIG. 4, SCENE1 and SCENE3 compensate the delay between audio and video caused by SCENE2. In SCENE1 there are more video field repetitions than necessary for this standalone scene. In SCENE2 there are neither video field repetitions nor audio frame droppings, the previous and following scenes provide sync (e.g. opening and closing credits). In SCENE3 there are more video field repetitions and audio frame droppings than necessary for this standalone scene.

Calculate pre- and post-delays of critical ('avy' and 'avY') scenes, see FIG. 7b and FIG. 4.

Manage critical scenes: can neighbour scenes compensate for the critical scene?
  if true, put pre- and post-delays into the neighbour scene or scenes;
  if not true, re-encode audio of the scene, and possibly add audio streams or whole parallel AV stream parts.

Optimisation, reduce remaining delays for sync as far as possible:
  still-picture: repeat as many still-picture fields as possible and necessary to synchronise video with audio;
  muted audio: drop as many muted audio frames as possible and necessary to synchronise audio with video; scene-cuts: repeat as many first and last scene-cut video fields as possible and necessary to synchronise audio and video;
  shift some drops/repetitions from minor-critical scenes to even less-critical neighbour scenes.

Finalisation, compensate for all remaining not yet synchronised scenes such that in:
  no- or low-motion scenes 'V' video fields are to be repeated, e.g. by using 24:1 pulldown;
  low-volume scenes 'A' audio frames are to be dropped, e.g. every 25th audio frame.

FIG. 5 shows an example for this phase. FIG. 5 is similar to FIG. 4 and emphasises the delays before concatenating the scenes, and the usage of audio drops/video repetitions to get a synchronised concatenating of the scenes.

e.3) Align Sub-Title Units to Audio or Video

This phase aligns the sub-titles (in DVD: sub-pictures) to video or audio:
  Sub-titles are synchronised with audio (default).
  Detecting sub-titles in scenes with a strong delay (automatic):
    a person decides, whether or not a video alignment shall be preferred;
    delays are seldom, i.e. only a few sub-titles need to be confirmed;
    assign the same alignment to all parallel sub-titles of divers languages, if existing.

e.4) Incorporate the 50i Information into the 24p/60i Disc Data Image (that is e.g. Stored on a Harddisc), i.e. into the AV Stream and the .ifo File or Files (HD-)DVD Video: navigation pack NV_PCK (i.e. information for this VOBU, only);
  list the video fields that shall be repeated (of coded frames 0 . . . 12, VOBU's average duration <0.5 s);
  list the audio frames or GOFs (linear PCM, Group Of Frames) that shall be dropped (of coded frames 0 . . . X, X depending on the type of audio, VOBU's average duration <0.5 s);
  sync offset between audio and video (for playback start, only), including indicating whether this playback shall start with top or bottom field;
  flag ('0' or '1') if sub-titles (e.g. in DVD: sub-picture units) are aligned to video;
  stored presentation times (usually in BCD format) shall be additional available for 50i playback.

(HD-)DVD Video: program chain PGC
  add information in the information files (navigation or higher level information, in DVD: IFO files) to indicate, that there are information items for 24p/60i as well as 50i playback in the IFO files and in the AV streams, whereby this kind of information may be obsolete, if an upper layer in the IFO file already indicates, that all PGCs contain 50i information;
  if there are any dedicated AV data for 50i (e.g. audio streams or whole VOBUs), then add 50i-PGC or 50i-PGCs, whereby 50i-PGCs are a copy of the existing 24p-PGCs but re-point either the audio streams or the cells for very critical scenes.

As an alternative to dedicated 50i-PGCs, expand the PGC definition to cover the information for presentation of the AV data as 24p, 60i, and 50i:
    add information to select the appropriate audio streams for 50i playback;
    add information to select the right cells;
    add information about the right presentation time (e.g. in BCD format), e.g. the duration of the whole program. Note: the duration time of the whole program differs between 50i and 24p/60i.

(HD-)DVD Video: set 50i compatibility flag or flags in the IFO file or files.

(HD-)DVD Video: all stored presentation times in the IFO file or files (which usually are in BCD format) shall be additional available for 50i playback.

Preferably, the additional 50i information items related to the sync offset between audio and video and the sub-picture presentation times and e.g. a bit list for indicating the video field repetitions and audio frame drops are arranged in a GOP (group of pictures) oriented, or in DVD in a VOBU (video object unit) oriented manner in the inventive output AV stream.

FIG. 10 depicts a VOBU or a GOP with video frames VFRMS I0, P0 to P2 and B0 to B7, in presentation order in the 24p time line 24pTL, together with the associated audio frames AFRMS A0 to A14, whereby only the hatched or grey part is coded in this current VOBU. The current VOBU is located between a previous VOBU PVOBU and a following VOBU NVOBU.

If necessary, a start offset between audio and video presentation is applied for the beginning of a presentation, e.g. a playback start after a direct jump into a chapter of the movie. FIG. 11 shows the related handling of an offset AV_OFFS between video and audio in the time line 24pTL and the 625/50 time line 625/50TL, wherein FIG. 11a shows a positive AV offset, FIG. 11b shows a zero AV offset, and FIG. 11c shows a negative AV offset. The upper part of FIGS. 11a, b and c shows the time line 24pTL whereas the lower part of FIGS. 11a, b and c shows the time line 625/50TL. If the presentation starts with the marked VOBU, then AV_OFFS describes the start offset between audio and video. The time stamp ts1 is the presentation start time of a special video frame SVF in the 24p time line. The presentation start time of this SVF in the 625/50 time line corresponds with the presentation time of an audio spot. The time stamp ts2 is the corresponding time in the 24p time line of this audio spot. The coded audio frames corresponding to ts1 and ts2 and this coded SVF start in the current VOBU or in a following VOBU NVOBU. Both, the audio frames and this frame SVF are decodable without decoding any previous VOBU PVOBU. In FIG. 11c the special video frame SVF is not frame I0 but frame P0, due to the negative AV offset. The complete GOP is decoded before, but the presentation starts with frame P0. FIG. 6 shows scenes that are too critical so that in such seldom cases additional 50i related audio streams or whole AV sequences (PGCAV) can be inserted into the AV stream. 'PGCA' means that the program chain selects the corresponding audio stream, but uses the same video stream. 'PGCAV' means that the program chain selects the according cell/angle for either 24p/60i or 50i playback.

In the flow diagram of the inventive mastering process in FIG. 8, a 24p Stream is generated in step 80 and the menus are generated in step 81. For 60i playback, 3:2 pulldown is added in step 82. Under control of a human 831, all scenes are categorized in step 83. The corresponding information is stored in an external file 841. In step 84, from the resulting categories, or from the categories stored in external file 841, audio drop and video field repetition locations are calculated. Under control of a human 851, subtitles are aligned to audio or video in step 85. The corresponding drops and repetitions are incorporated into the AV Stream in step 86. Additional audio and video stream data are incorporated into the AV Stream in step 87. Navigation and control data are incorporated into the information files in step 88. Thereafter the Master is generated in step 89.

In the block diagram of an inventive mastering device in FIG. 9 there is a video/audio/subtitle/menu encoder VASMENC 90 providing a source 24p/60iAVS 91 for a DVD Video 24p/60i AV stream. This AV stream AVS is split in a demultiplexer DMUX 92 into an audio stream AS and a video stream VS. The video stream enters an automatic video scenes detector AUVSCDET 94 in which the video stream is decoded in a video decoder VDEC 941, and the audio stream enters an automatic audio scenes detector AUASCDET 93 in which the audio stream is decoded in an audio decoder ADEC 931. AUASCDET 94 includes a video motion detection stage VMOTDET 944 that uses motion vectors, a still picture detection stage STPICDET 942 and a scene cut detection stage SCCTDET 943. AUASCDET 93 includes a harmonic audio only detection stage HAO 934, an audio peaks detection stage AP 932 and a speech detection stage SP 933. The detected (combined or separate) video scene information items DETVSC, the detected audio scenes information items DETASC and detected lip-sync scenes information items DETLPSSC are combined in a combiner CMB 952 and the collected scene items are stored in a memory MEM 97. This memory serves as a storage for scene items, AV drop/repetition items and sub-title alignment (initially: align to audio).

The AV stream AVS is also fed to one or more monitors MON 911, 913. On one monitor 911 a person checks the candidate audio peak scenes and the candidate speech scenes that were automatically detected in the audio scenes detector AUASCDET. A resulting human control signal HCTRL1 912 determines e.g. by using a switch SW 951 which ones of the automatically detected candidate audio peak scenes and candidate speech scenes will form the lip-sync scenes information items DETLPSSC.

The (video and audio) scenes information items SC taken from memory MEM 97 are fed to an AV delays calculator AVDELC 962. The resulting delay information items can be used to generate additional AV data for very critical scenes in a generator ADDAVDGEN 96, and pass through a delays optimiser DELOPT 961 in the form of scenes with strong delays and sub-titles to a monitor MON 913. A person checks whether or not a sub-title is aligned to the corresponding video signal content. A resulting human control signal HCTRL2 914 determines corresponding changes for the sub-title/video alignment and the resulting information items are stored in memory MEM 97. Delays optimiser DELOPT 961 also provides the required information items for audio frame drops and video field repetitions, which are also stored in memory MEM 97.

The information about audio frame drops and video field repetitions, sub-title alignment and new presentation times is fed from memory means MEM 97 to a final AV stream modificator FAVSM 98 and is used therein to amend IFO files and additional AV stream information, which can be incorporated as additional AV stream data into the DVD Video 24p/60i AV stream of source 24p/60iAVS, or into a copy of that stream. The additional AV data for very critical scenes generated in generator ADDAVDGEN 96 are also incorporated as additional AV stream data and IFO files into the DVD Video 24p/60i AV stream of source 24p/60iAVS, or into a copy of that stream.

Advantageously, by the merged authoring the 50i processing is just an additional process step for the same storage medium master. 50i authoring is a mainly automatic process, human interaction is required only for a few confirmations of detection results. The categories found are very fault-tolerant, i.e. are simple to implement. Even some bad-set video repetitions are hardly noticeable.

Generally, the disc memory consumption does not increase. Only in seldom cases a few additional megabytes are required.

It is estimated that more than 90% of all movie discs do not need even additional PGCs.

By the reduction of the number of masters a cheaper mass production is facilitated.

If desired, the inventive disc may be authored for 24p/50i only, i.e. it does not contain 60i-PGCs.

The downconversion from 24p high definition (HD) to standard definition (SD) works for 50i presentation, too.

It is also possible to convert 60p (HD or SD) source content for 50i format presentation. For this task an analogue kind of processing is used. The main difference to the above-described method is that (many more) video fields need to be dropped instead of being repeated for facilitating 50i format presentation. The reduction of the number of fields is achieved by theoretically performing an 'inverse 3-2 pull-down' and by further dropping between 50% and 54.2% of the remaining video fields, whereby sometimes even whole video frames are dropped, and by applying the invention on the resulting 48p format to get the desired 50i logical (or 49i physical) format presentation. In practise, however, there is no fixed-ratio pulldown but an adaptive field/frame dropping so that there is a direct video conversion from 60p to about 49i (physically), using the principle of the invention.

If the source content has 48p format and the 60p format is authored by generating and adding corresponding 3-2 pull-down data items, then video field dropping and a corresponding audio frame dropping is performed such that on average a (physical) 49i presentation speed is achieved, whereby the 3-2 pulldown is not activated (i.e. the corresponding flags are ignored) for the 50i logical (or 49i physical) format presentation. The amount of dropped video fields will be between 50% and 54.2%, i.e. about every second field needs to be dropped, sometimes even whole video frames.

In this description the expression "audio frame" is used. "Audio frame" means a piece of audio corresponding to a duration of between 15 and 50 ms. In case an audio signal type (e.g. linear PCM) uses shorter audio pieces, an appropriate group of such short audio frames shall be used instead. For example, a GOF shall represent an "audio frame" in case of linear PCM.

The invention claimed is:

1. A method for authoring or generating or coding an audio/video data stream that represents a video signal and one or more audio signals, said video signal having 24 Hz video frame frequency and said audio signal or signals having original speed, wherein said authoring or generating or coding comprises the following steps:

encoding the video signal in 24p format and optionally adding 3-2 pull-down data items for facilitating a playback with 60 Hz or nearly 60 Hz field frequency, and encoding the one or more audio signals according to said original speed;

encoding sub-title data, and generating menus related to at least one of said video signal, one or more audio signal and sub-title data;

generating additional data items for facilitating a subjectively synchronized presentation of said audio and video signals with an average field frequency lying in the range between 48 Hz and 50 Hz, denoted 50i format, thereby including in said audio/video data stream video repetition information items which can be used in a presentation unit for said video and audio signals for controlling video signal field or frame repetition, and including audio dropping information items which can be used in said presentation unit for controlling audio signal frame dropping, this generating step comprising the further steps:

automatically determining video and audio scenes in said audio/video data stream and automatically categorizing different types of said video and audio scenes with respect to a required video/audio presentation synchronism in said 50i format, including determining critical video and audio scenes in which no audio frame drop or video field repeat, respectively, occur; calculating for each one of said video and audio scenes the maximum manageable number of audio frame drops and/or video field repeats, respectively;

calculating a corresponding distribution of audio frame drop information items and/or video field repeat information items for non-critical scenes, and calculating whether or not a video/audio delay introduced by a current critical scene can be compensated for by a corresponding number of audio frame drops and/or video field repeats in adjacent non-critical scenes, and if true, providing a corresponding number of video repetition information items and audio dropping information items for the non-critical scenes, said video repetition information items and said audio dropping information items forming a part of said 50i format additional data items, if not true, re-encoding in said 50i format audio data or video data for said current critical scene so as to form a part of said 50i format additional data items; and incorporating said 50i format additional data items into related data fields of said audio/video data stream or a copy of said audio/video data stream.

2. The method according to claim 1, wherein for said 50i format additional data items sub-title units are aligned to said video or audio data.

3. The method according to claim 1, wherein said category types are: scene cut currently present or not present; lip-sync of audio and video currently required or not required, and at least one video related and at least one audio related type from: motion or no motion in current video content; very dark or very bright scene currently present or not present; sound currently present or not present; low volume, or hearable noise, or non-music, or constant frequencies and volume currently present or not present; current change of harmonic audio without any hearable noise present or not present.

4. The method according to claim 3, wherein a person confirms whether or not the automatically found candidate lip-sync scenes really require lip-sync.

5. The method according to claim 1, wherein: in a no-motion scene type as many still-picture fields as possible and necessary are repeated to synchronize video with audio; in a muted audio scene type as many muted audio frames as possible and necessary are dropped to synchronize audio with video; in a scene-cut scene type as many first and last scene-cut video fields as possible and necessary are repeated to synchronize audio and video.

6. The method according to claim 1, wherein said 50i format additional data items are selected such that in a no- or low-motion scene type video fields are to be repeated by using 24:1 pull-down, and/or that in low-volume scenes every 25th audio frame is to be dropped.

7. The method according to claim 1, wherein said 50i format additional data items are inserted into navigation data packets and/or into an ifo file of said audio/video data stream.

8. A method for authoring or generating or coding an audio/video data stream that represents a video signal and one or more audio signals, said video signal having 60 Hz video frame frequency and said audio signal or signals having original speed, wherein said authoring or generating or coding comprises the following steps:

encoding the video signal in 60p format, and encoding audio data according to said original speed;

encoding sub-title data, and generating menus related to at least one of said video signal, one or more audio signal data and sub-title data;

generating additional data items for facilitating a subjectively synchronized presentation of said audio and video signals with an average field frequency lying in the range between 48 Hz and 50 Hz, denoted 50i format, and including in said audio/video data stream, video dropping information items which can be used in a presentation unit for said video and audio signals for controlling video signal field or frame dropping, and including audio dropping information items which can be used in said presentation unit for controlling audio signal frame dropping, this generating step comprising the further steps:

automatically determining video and audio scenes in said audio/video data stream and automatically categorizing different types of said video and audio scenes with respect to a required video/audio presentation synchronism in said 50i format, including determining critical video and audio scenes in which no audio frame drop or video field or frame drop, respectively, occur;

calculating for each one of said video and audio scenes the maximum manageable number of audio frame drops and/or video field or frame drops, respectively; calculating a corresponding distribution of audio frame drop information items and/or video field or frame drop information items for non-critical scenes, and calculating whether or not a video/audio delay introduced by a current critical scene can be compensated for by a corresponding number of audio frame drops and/or video field or frame drops in adjacent non-critical scenes, and if true, providing a corresponding number of video dropping information items and audio dropping information items for the non-critical scenes, said video dropping information items and said audio dropping information items forming a part of said 50i format additional data items, if not true, re-encoding in said 50i format audio data or video data for said current critical scene so as to form a part of said 50i format additional data items; and incorporating said 50i format additional data items into related data fields of said audio/video data stream or a copy of said audio/video data stream.

9. The method according to claim 8, wherein for said 50i format additional data items sub-title units are aligned to said video or audio data.

10. The method according to claim 8, wherein said category types are: scene cut currently present/not present; lip-sync of audio and video currently required/not required, and at least one video related and at least one audio related type from: motion/no motion in current video content; very dark or very bright scene currently present/not present; sound currently present or not present; low volume, or hearable noise, or non-music, or constant frequencies and volume currently present/not present; current change of harmonic audio without any hearable noise present/not present.

11. The method according to claim 10, wherein a person confirms whether or not the automatically found candidate lip-sync scenes really require lip-sync.

12. The method according to claim 8, wherein: in a no-motion scene type as many still-picture fields as possible and necessary are repeated to synchronize video with audio; in a muted audio scene type as many muted audio frames as possible and necessary are dropped to synchronize audio with video; in a scene-cut scene type as many first and last scene-cut video fields as possible and necessary are repeated to synchronize audio and video.

13. The method according to claim 8, wherein said 50i format additional data items are selected such that in a no or low-motion scene type video fields are to be repeated by using 24:1 pull-down, and/or that in low-volume scenes every 25th audio frame is to be dropped.

14. The method according to claim 8, wherein said 50i format additional data items are inserted into navigation data packets and/or into an .ifo file of said audio/video data stream.

15. A method for authoring or generating or coding an audio/video data stream that represents a video signal and one or more audio signals, said video signal having 48 Hz video frame frequency and said audio signal or signals having original speed, wherein said authoring or generating or coding comprises the following steps:

Encoding the video signal in 48p format and adding 3-2 pull-down data items for facilitating a playback with 60 Hz or nearly 60 Hz frame frequency, and encoding the one or more audio signals according to said original speed;

encoding sub-title data, and generating menus related to at least one of said video signal, one or more audio signals and sub-title data;

generating additional data items for facilitating a subjectively synchronized presentation of said audio and video signals with an average field frequency lying in the range between 48 Hz and 50 Hz, denoted 50i format, and ignoring said 3-2 pull-down data items for said 50i format presentation and including in said audio/video data stream video dropping information items which can be used in a presentation unit for said video and audio signals for controlling video signal field or frame dropping, and including audio dropping information items which can be used in said presentation unit for controlling audio signal frame dropping, this generating step comprising the further steps:

automatically determining video and audio scenes in said audio/video data stream and automatically Categorizing different types of said video and audio scenes with respect to a required video/audio presentation synchronism in said 50i format, including determining critical video and audio scenes in which no audio frame drop or video field repeat, respectively, occur;

calculating for each one of said scenes the maximum manageable number of audio frame drops and/or video field or frame drops, respectively;

calculating a corresponding distribution of audio frame drop information items and/or video field or frame drop information items for non-critical scenes, and calculating whether or not a video/audio delay introduced by a current critical scene can be compensated for by a corresponding number of audio frame drops and/or video field or frame drops in adjacent non-critical scenes, and if true, providing a corresponding number of video dropping information items and audio dropping information items for the non-critical scenes, said video dropping information items and said audio dropping information items forming a part of said 50i format additional data items, if not true, re-encoding in said 50i format audio data or video data for said current critical scene so as to form a part of said 50i format additional data items; and incorporating said 50i format additional data items into related data fields of said audio/video data stream or a copy of said audio/video data stream.

16. The method according to claim 15, wherein for said 50i format additional data items sub-title units are aligned to said video or audio data.

17. The method according to claim 15, wherein said category types are: scene cut currently present/not present; lip-sync of audio and video currently required/not required, and at least one video related and at least one audio related type from: motion/no motion in current video content; very dark or very bright scene currently present/not present; sound currently present or not present; low volume, or hearable noise, or non-music, or constant frequencies and volume currently present/not present; current change of harmonic audio without any hearable noise present/not present.

18. The method according to claim 17, wherein a person confirms whether or not the automatically found candidate lip-sync scenes really require lip-sync.

19. The method according to claim 15, wherein: in a no-motion scene type as many still-picture fields as possible and necessary are repeated to synchronize video with audio; in a muted audio scene type as many muted audio frames as possible and necessary are dropped to synchronize audio with video; in a scene-cut scene type as many first and last scene-cut video fields as possible and necessary are repeated to synchronize audio and video.

20. The method according to claim 15, wherein said 50i format additional data items are selected such that in a no- or low-motion scene type video fields are to be repeated by using 24:1 pull-down, and/or that in low-volume scenes every 25th audio frame is to be dropped.

21. The method according to claim 15, wherein said 50i format additional data items are inserted into navigation data packets and/or into an .ifo file of said audio/video data stream.

22. A non-transitory storage medium having computer executable instructions, upon execution by a processor, causes the processor to author or generate or code an audio/video data stream according to the method of claim 1.

23. A non-transitory storage medium having computer executable instructions, upon execution by a processor, causes the processor to author or generate or code an audio/video data stream according to the method of claim 8.

24. A non-transitory storage medium having computer executable instructions, upon execution by a processor, causes the processor to author or generate or code an audio/video data stream according to the method of claim 15.

* * * * *